United States Patent
Kwag et al.

(10) Patent No.: US 7,408,605 B2
(45) Date of Patent: Aug. 5, 2008

(54) LIQUID CRYSTAL DISPLAY PANEL

(75) Inventors: Jin-Oh Kwag, Suwon (KR); Jang-Soo Kim, Suwon (KR); Kyung-Eun Lee, Seoul (KR); Dong-Gyu Kim, Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 439 days.

(21) Appl. No.: 10/790,244

(22) Filed: Mar. 2, 2004

(65) Prior Publication Data

US 2004/0227887 A1 Nov. 18, 2004

Related U.S. Application Data

(63) Continuation of application No. 09/955,218, filed on Sep. 19, 2001, now Pat. No. 6,700,635.

(30) Foreign Application Priority Data

Sep. 19, 2000 (KR) .............................. 2000-504918

(51) Int. Cl.
*G02F 1/1343* (2006.01)
*G02F 1/1337* (2006.01)

(52) U.S. Cl. ...................... 349/129; 349/128; 349/143; 349/146

(58) Field of Classification Search .................. 349/122, 349/124, 128, 129, 130, 139, 143, 160, 166, 349/178, 144, 146; 345/38, 50, 87
See application file for complete search history.

(56) References Cited

U.S. PATENT DOCUMENTS

| | | | | |
|---|---|---|---|---|
| 6,229,589 B1 | | 5/2001 | Koma | 349/139 |
| 6,407,791 B1 | | 6/2002 | Suzuki et al. | 349/129 |
| 6,456,352 B1 | | 9/2002 | Matsuyama et al. | 349/143 |
| 6,504,592 B1 | * | 1/2003 | Takatori et al. | 349/129 |
| 6,573,964 B1 | * | 6/2003 | Takizawa et al. | 349/129 |
| 6,738,120 B1 | * | 5/2004 | Song et al. | 349/139 |
| 6,879,364 B1 | * | 4/2005 | Sasaki et al. | 349/129 |
| 2001/0006408 A1 | | 7/2001 | Matsuyama et al. | 349/143 |
| 2002/0047961 A1 | | 4/2002 | Kwag et al. | 349/110 |
| 2002/0085152 A1 | * | 7/2002 | Chuang et al. | 349/123 |
| 2004/0189914 A1 | * | 9/2004 | Matsuyama | 349/129 |

FOREIGN PATENT DOCUMENTS

KR 1999 0085360 12/1999

OTHER PUBLICATIONS

Derwent Abstract 2001-462848—Abstract Pub. No. KR 2001005217A published Jan. 2001.*
English Abstract for Publication No. 1999-0085360.

* cited by examiner

*Primary Examiner*—Dung Nguyen
*Assistant Examiner*—Tai Duong
(74) *Attorney, Agent, or Firm*—F. Chau & Associates, LLC

(57) ABSTRACT

A pixel electrode is located in a pixel area defined by the intersections of the two adjacent gate lines and the two adjacent data lines, and has two linear openings extending in the transverse direction, which divide the pixel electrodes into three rectangular portions arranged in the longitudinal direction. The portions are connected in turn, and each portion of the pixel electrode has an X-shaped projection formed by the X-shaped member thereunder, and portions of the gate insulating film and the passivation film on the member. Since the gate insulating film and the passivation film are also located on the gate lines and the data lines, and the layered structure on the wires acts as peripheral projections of the pixel electrode. Each area enclosed by the projections, the openings and the peripheral projections is in a shape of equilateral trapezoid. The areas may be defined as the areas where the pixel electrode is in direct contact with the substrate. That is, each area has a planar shape of triangle, of which corner at the center of X-shape is chamfered. This structure causes a splay arrangement or a bend arrangement of the liquid crystal molecules in each domain, which is defined as a portion of the liquid crystal layer over each divided area, to be reinforced to improve the response time.

4 Claims, 12 Drawing Sheets

LIQUID CRYSTAL DISPLAY PANEL

This is a continuation application of the U.S. patent application Ser. No. 09/955,218, filed Sep. 19, 2001 now U.S. Pat. No.6,700,635.

BACKGROUND OF THE INVENTION (a) Field of the Invention

The present invention relates to a liquid crystal display (LCD) panel, and, in particular, to a thin film transistor (TFT) array panel for an LCD.

(b) Description of the Related Art

Generally, an LCD includes an upper panel having a common electrode and a plurality of color filters, a lower panel having pluralities of TFTs and pixel electrodes, and a liquid crystal layer between the two panels. The pixel electrodes and the common electrode are applied with different electric potentials to generate electric fields which change the alignment of liquid crystal molecules to control the light transmittance, thereby displaying images.

However, an LCD has a serious disadvantage of its narrow viewing angle. To overcome this disadvantage, various techniques for widening the viewing angle are suggested. Among them, there is a technique that the liquid crystal molecules are aligned perpendicular to the upper and the lower panels and pluralities of openings and/or projections are provided in the pixel electrodes and a common electrode facing the pixel electrodes.

In a conventional technique directed to the openings, the openings are provided in both the pixel electrodes and the common electrode to generate fringe field. The tilt directions of the liquid crystal molecules are adjusted by using the fringe field. A conventional technique related to the projections adjusts the tilt directions of the liquid crystal molecules by using electric fields which are distorted by the projections. In a European Patent EP 0 884 626 A2, various features of the projections are suggested.

Although the viewing angle of the LCD is improved as suggested by the above conventional techniques, the response time of the liquid crystal molecules is not still improved so that it is difficult to display dynamic images due to afterimages.

SUMMARY OF THE INVENTION

It is an object of the present invention to improve the response time as well as the viewing angle of an LCD.

The LCD panel according to the present invention includes an insulating substrate and a pixel electrode formed on the substrate. The pixel electrode has pluralities of openings and X-shaped projections protruding from surface of the pixel electrode. The openings are disposed between the projections. An area enclosed by the X-shaped projections, the openings, and boundary of the pixel electrode has a planar shape of equilateral trapezoid or acute angle. A long side of the equilateral trapezoid is convex or curved.

Furthermore, the LCD panel according to the present invention includes a plurality of X-shaped members located under the respective projections and an insulating layer between the projections and the X-shaped members, thereby causing the projections to protrude. The insulating layer has a double-layered structure. The pixel electrode except for the projections is in direct contact with the substrate. The X-shaped members are made of metal and at least two thereof are connected to each other.

DETAILED DESCRIPTION OF THE PREFERRED EMBODIMENTS

Figure 1:
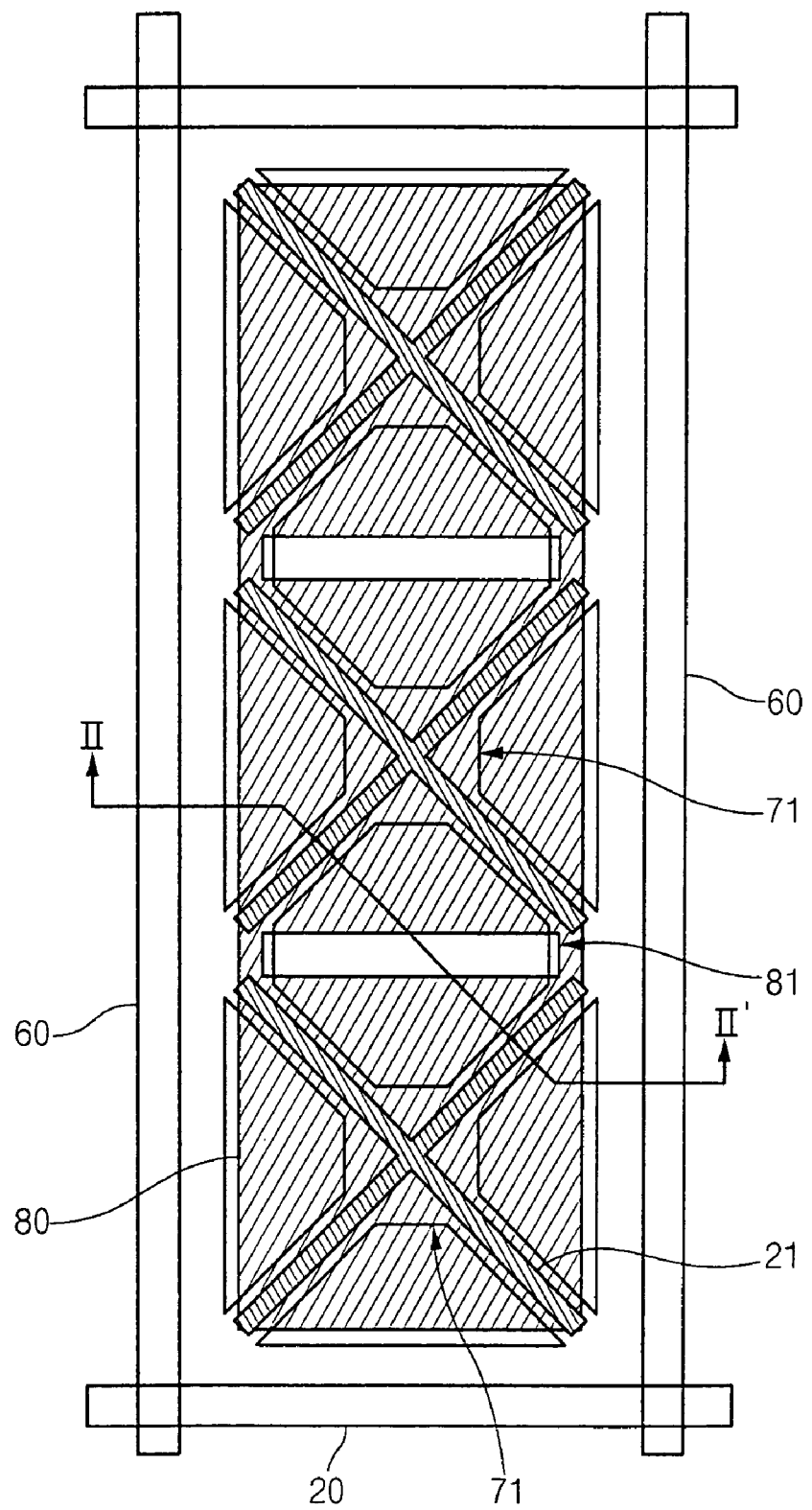
FIG. 1 is a layout view of an LCD panel according to a first embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Figure 2:
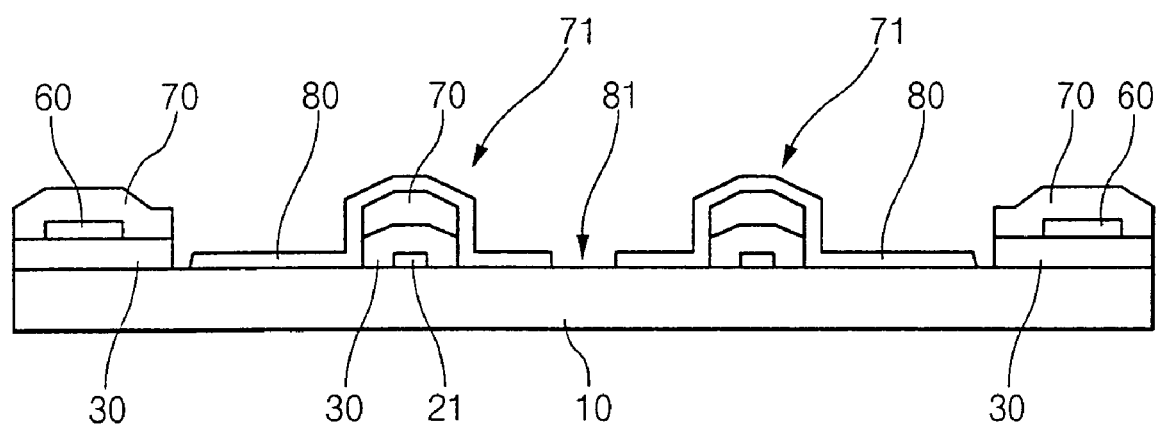
FIG. 2 is a sectional view taken along line II-II' in FIG. 1.

FIG. 1 is a layout view of an LCD panel according to a first embodiment of the present invention and FIG. 2 is a sectional view taken along line II-II' in FIG. 1.

A plurality of gate lines 20 transmitting scanning signals and extending in a transverse direction and three X-shaped members 21 made up of the same material as the gate lines 20 are formed on an insulating substrate 10, and the members 21 are arranged in a longitudinal direction. A gate insulating film 30 covers both the gate lines 20 and the X-shaped members 21, and portions of the gate insulating film 30 near the center of the X-shaped member 21 have rectangular shapes. A plurality of data lines 60 transmitting image signals and extending in the longitudinal direction are formed on the gate insulating film 30. A passivation film 70 is formed on the data lines 60, and a pixel electrode 80 is formed on the passivation film 70 and the substrate 10. The planar shapes of the gate insulating film 30 and the passivation film 70 are the same.

One pixel electrode 80 is located in a pixel area defined by the intersections of the two adjacent gate lines 60 and the two adjacent data lines 20, and has two linear openings 81 extending in the transverse direction, which divide the pixel electrodes 80 into three rectangular portions arranged in the longitudinal direction. The portions are connected in turn, and each portion of the pixel electrode 80 has an X-shaped projection 71 formed by the X-shaped member 21 thereunder, and portions of the gate insulating film 30 and the passivation film 70 on the member 21. Each projection 71, which lies in the respective portion, defines four areas for one portion. Since the gate insulating film 30 and the passivation film 70 are also located on the gate lines 20 and the data lines 60, the layered structure on the wires 20 and 60 acts as peripheral projections of the pixel electrode 80. Each area enclosed by the projections 71, the openings 81 and the peripheral projections is in a shape of equilateral trapezoid. The areas may be defined as the areas where the pixel electrode 80 is in direct contact with the substrate 10. That is, each area has a planar shape of triangle, of which corner at the center of X-shape is chamfered.

This structure causes a splay arrangement or a bend arrangement of the liquid crystal molecules in each domain, which is defined as a portion of the liquid crystal layer over each divided area, to be reinforced to improve the response time. The response times $\tau_{on}$, which is a transition time from the state with 10% transmittance to the state with 90% transmittance, and $\tau_{off}$, the transition time from the state with 90% transmittance to the state with 10% transmittance are expressed as follows:

$$\tau_{on} = \frac{\gamma}{\frac{\Delta \varepsilon E^2}{4\pi} - \frac{\pi^2}{d^2}K} \quad <\text{Equation 1}>$$

$$\tau_{off} = \frac{\gamma d^2}{\pi^2 K}$$

where $\Delta \varepsilon$ is dielectric anisotropy, $\gamma$ is a coefficient of rotary viscosity, d is a cell gap, E is applied voltage, and K is a coefficient related to elasticity. The coefficient K is defined as follows:

$$K = K_{11} + \frac{K_{33} - 2K_{22}}{4} \quad <\text{Equation 2}>$$

where $K_{11}$, $K_{22}$ and $K_{33}$ are coefficients of splay elasticity, twist elasticity and bend elasticity of the liquid crystal molecules, respectively. As shown Equations 1 and 2, the response time $\tau_{on}$ or $\tau_{off}$ gets smaller as the coefficient K increases, that is, $K_{11}$ or $K_{33}$ increases, thereby improving the response time.

Figure 3:
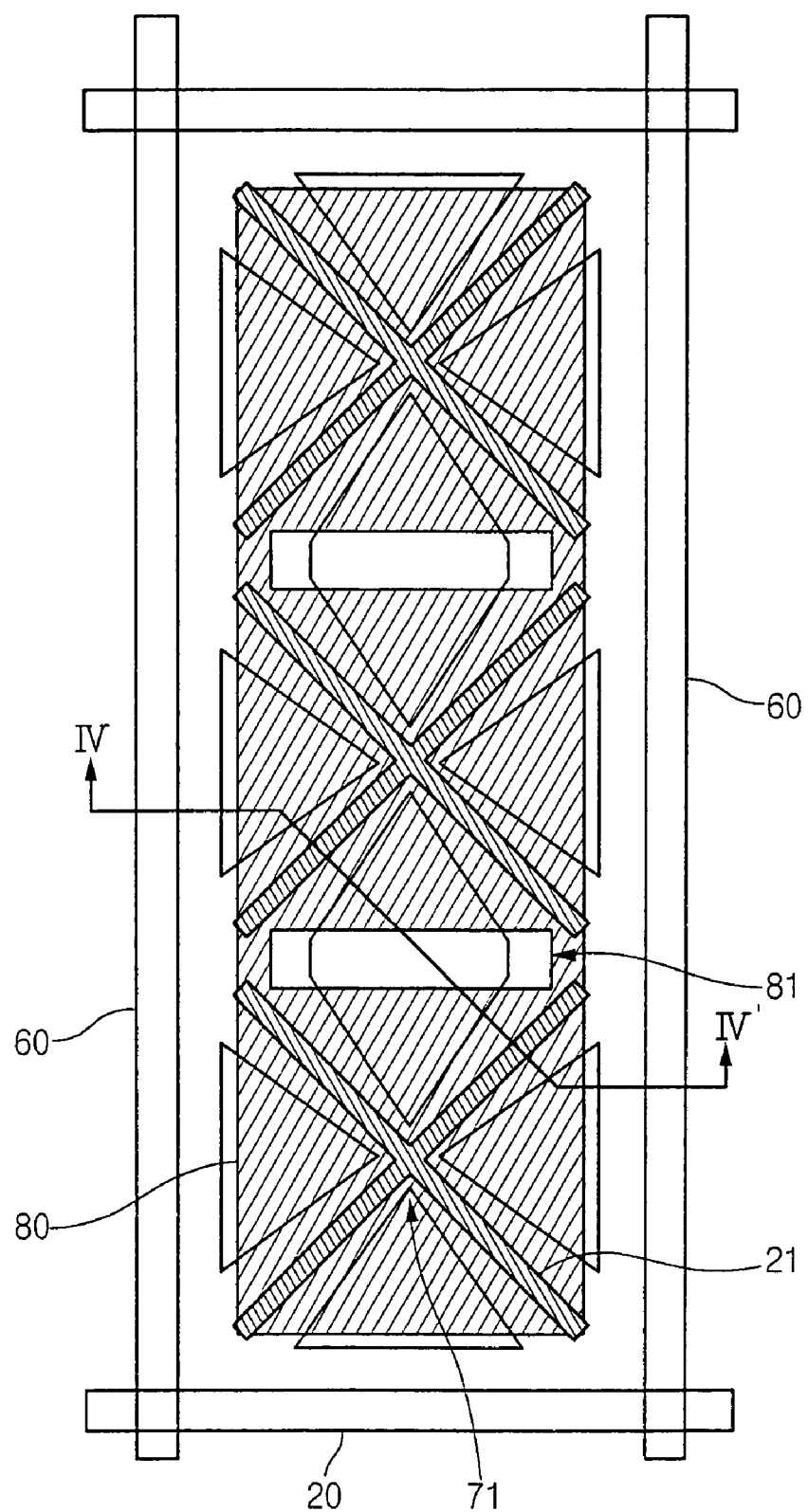
FIG. 3 is a layout view of an LCD panel according to a second embodiment of the present invention.
Figure 4:
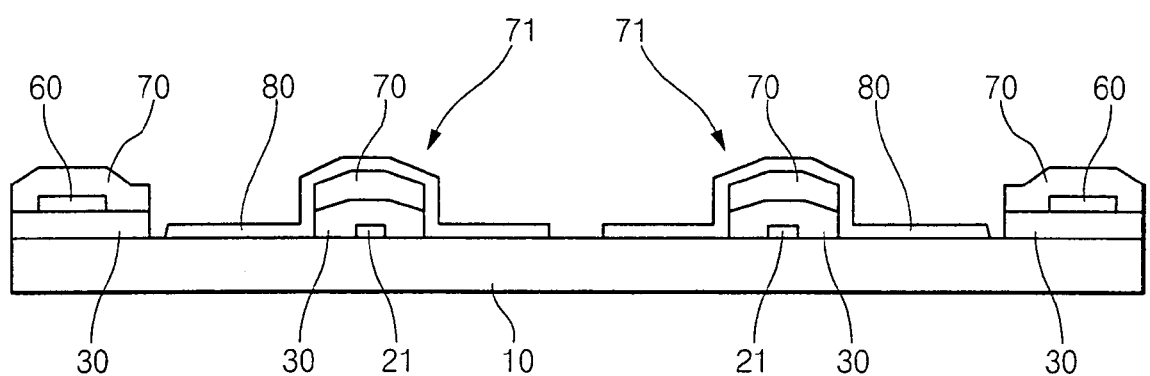
FIG. 4 is a sectional view taken along line IV-IV' in FIG. 3.

FIG. 3 is a layout view of an LCD panel according to a second embodiment of the present invention, and FIG. 4 is a sectional view taken along line IV-IV' in FIG. 3.

The layered structure of an LCD panel of the second embodiment is almost the same as that of the first embodiment.

The important features of the second embodiment different from the first embodiment are the shapes of X-shaped projections 71 of a pixel electrode 80 and a passivation film 70 and a gate insulating film 30 thereunder. That is, the X-shaped projection 71 has the width increasing as goes from the center toward ends, and does not include the rectangular shape which the first embodiment includes. Accordingly, each area enclosed by the projections 71, the openings 81 and the boundaries of the pixel electrode 80 is in a shape of acute triangle, thereby reinforcing the splay arrangement or the bend arrangement near the projections.

Figure 5:
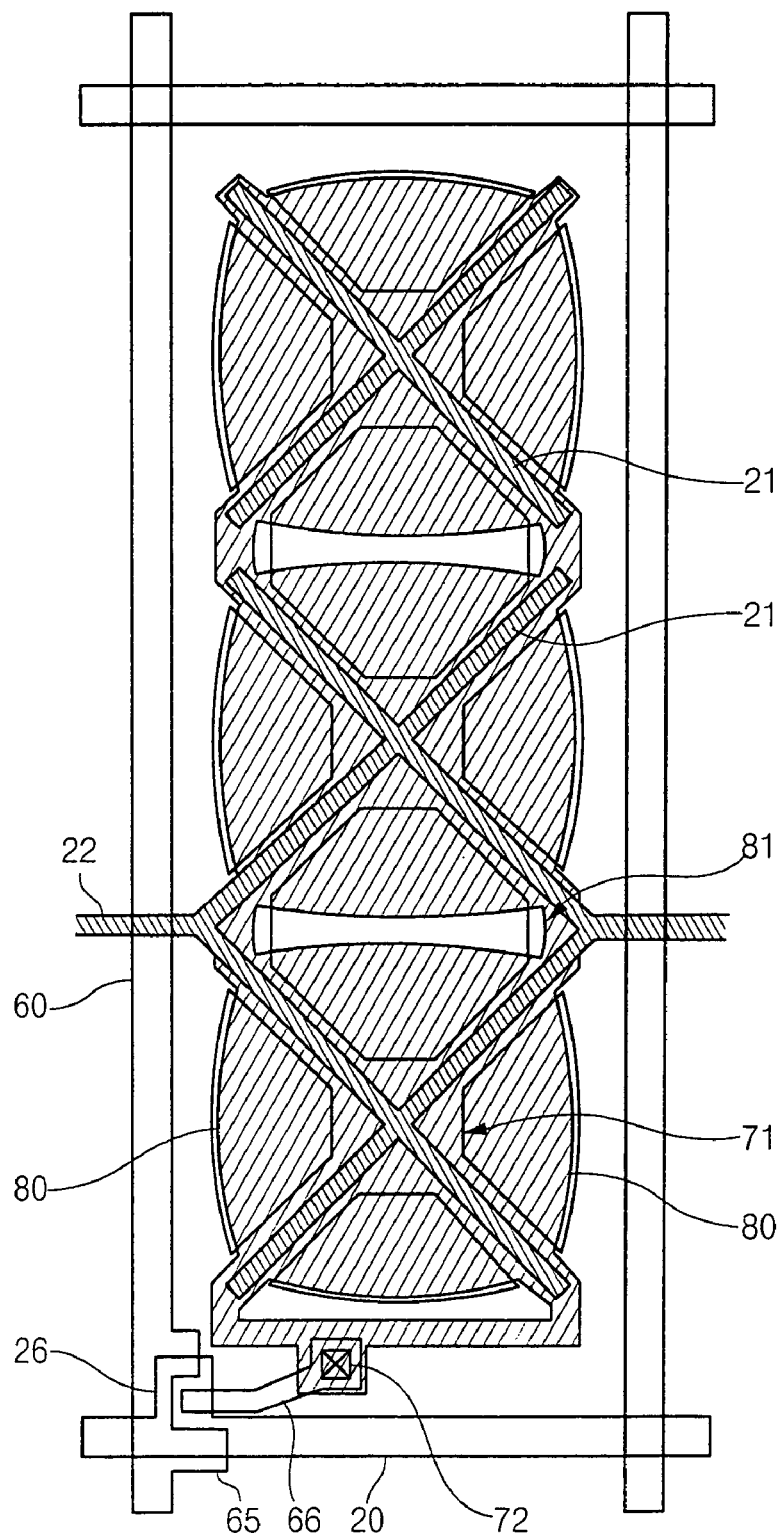
FIG. 5 is a layout view of an LCD panel according to a third embodiment of the present invention.

FIG. 5 is a layout view of an LCD panel according to a third embodiment of the present invention.

The layered structure of an LCD panel of the third embodiment is almost the same as that of the first embodiment.

The primary features of the third embodiment different from the first embodiment are that common signal lines 22 connected to X-shaped members 21 are provided, and the outlines of a pixel electrode 80 are convexly curved to make the boundary lines of the divided areas to be curved.

In detail, the shape of each portion of the pixel electrode 80 divided by openings 81 is a curved rectangle so that each area, which is in a shape of equilateral trapezoid in FIG. 1, is in a shape of equilateral trapezoid with a curved long side. In addition, X-shaped members 21 protrude out of the apexes of the curved rectangle and so the pixel electrode 80. The long sides of each opening 81 are concave, and the short sides are convex. At least two of the three X-shaped members 21 are connected to each other at the ends thereof, and the common signal line 22 is connected to the connection of the X-shaped members 21. The common signal line 22 extends from the connection toward data lines 60 and is connected to the X-shaped members 21 of the adjacent pixel after intersecting the data lines 60.

Furthermore, FIG. 5 shows a TFT located near the intersections of the gate lines 20 and the data lines 60, and a connection structure of the TFT and the pixel electrode 80. The TFT includes a gate electrode 26 which is a branch of the gate line 20, an I-shaped source electrode 65 which is a branch of the data line 60, and a drain electrode 66 which is spaced apart from the source electrode 65 and formed of the same layer as the data lines 60. The drain electrode 66 is covered by a passivation film (reference numeral 70 in FIG. 1), and a contact hole 72 is provided on a portion of the passivation film 70 on the drain electrode 66. The portion of the pixel electrode 80 adjacent to the TFT extends downward to be connected to the drain electrode 66 via the contact hole 72.

Figure 6:
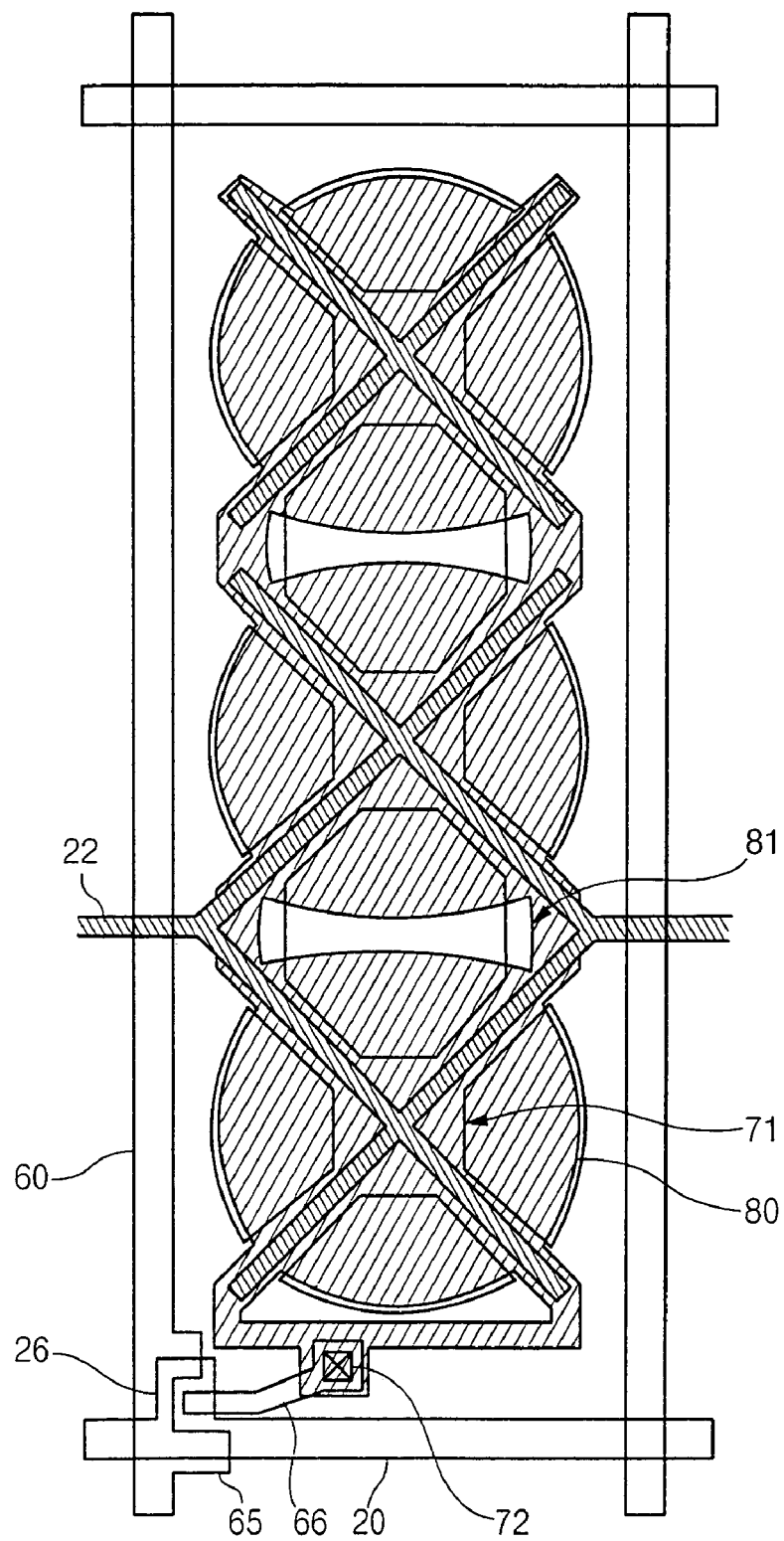
FIG. 6 is a layout view of an LCD panel according to a fourth embodiment of the present invention.

FIG. 6 shows an LCD panel according to a fourth embodiment of the present invention.

The layered structure of an LCD panel of the fourth embodiment is almost the same as that of the third embodiment. However, the outlines of a pixel electrode 80 in this embodiment are much curved to make the boundary lines of the divided areas to be circled.

Figure 10A:
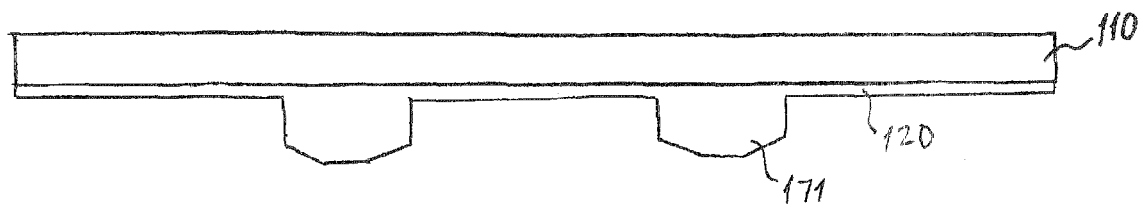
FIG. 10A is a sectional view of a color filter panel according to an embodiment of the present invention.
Figure 10B:
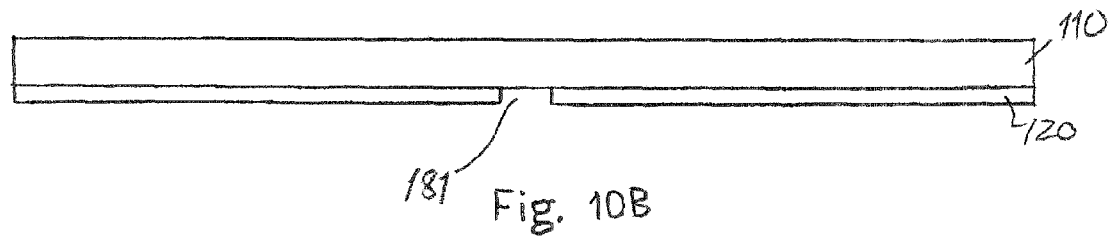
FIG. 10B is a sectional view of a color filter panel according to an embodiment of the present invention.
Figure 11A:
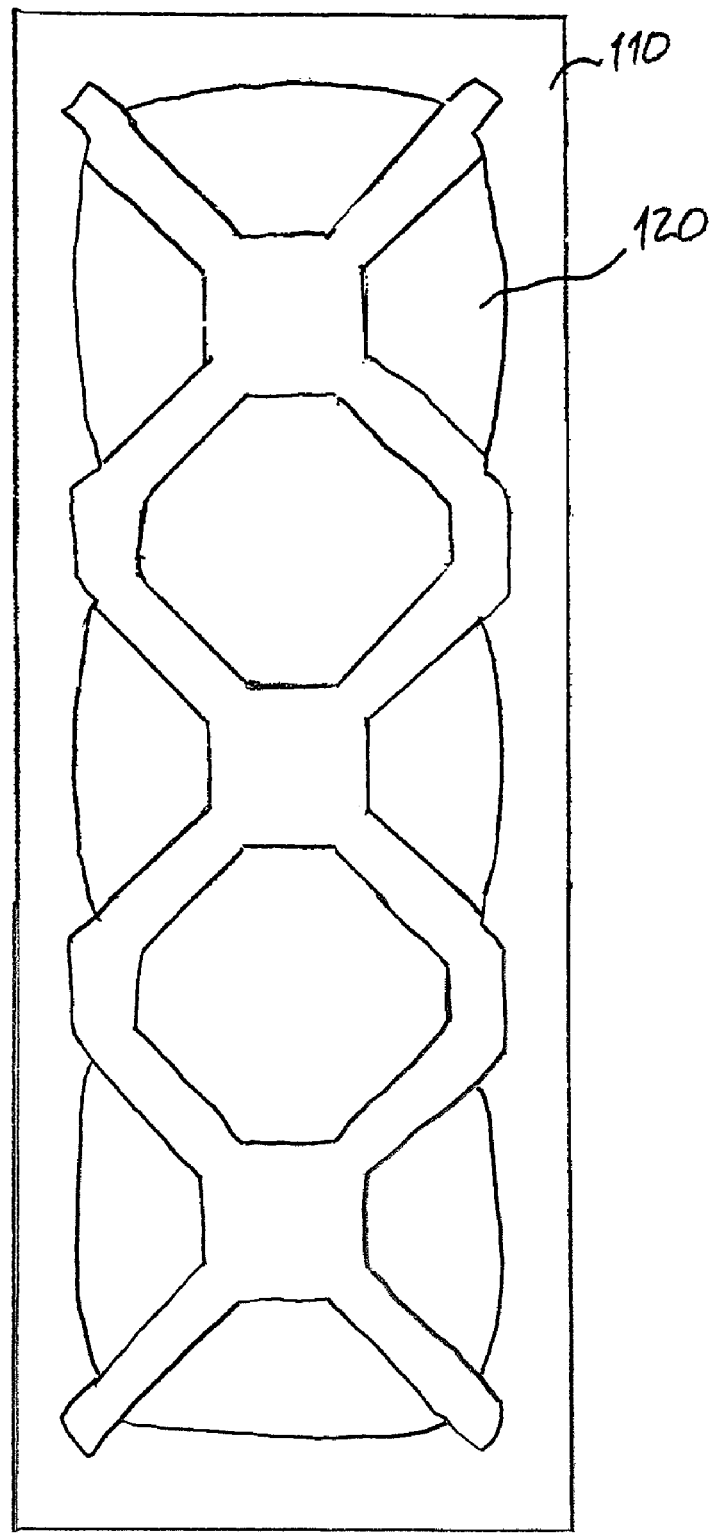
FIG. 11A is a layout view of a color filter panel according to an embodiment of the present invention.
Figure 11B:
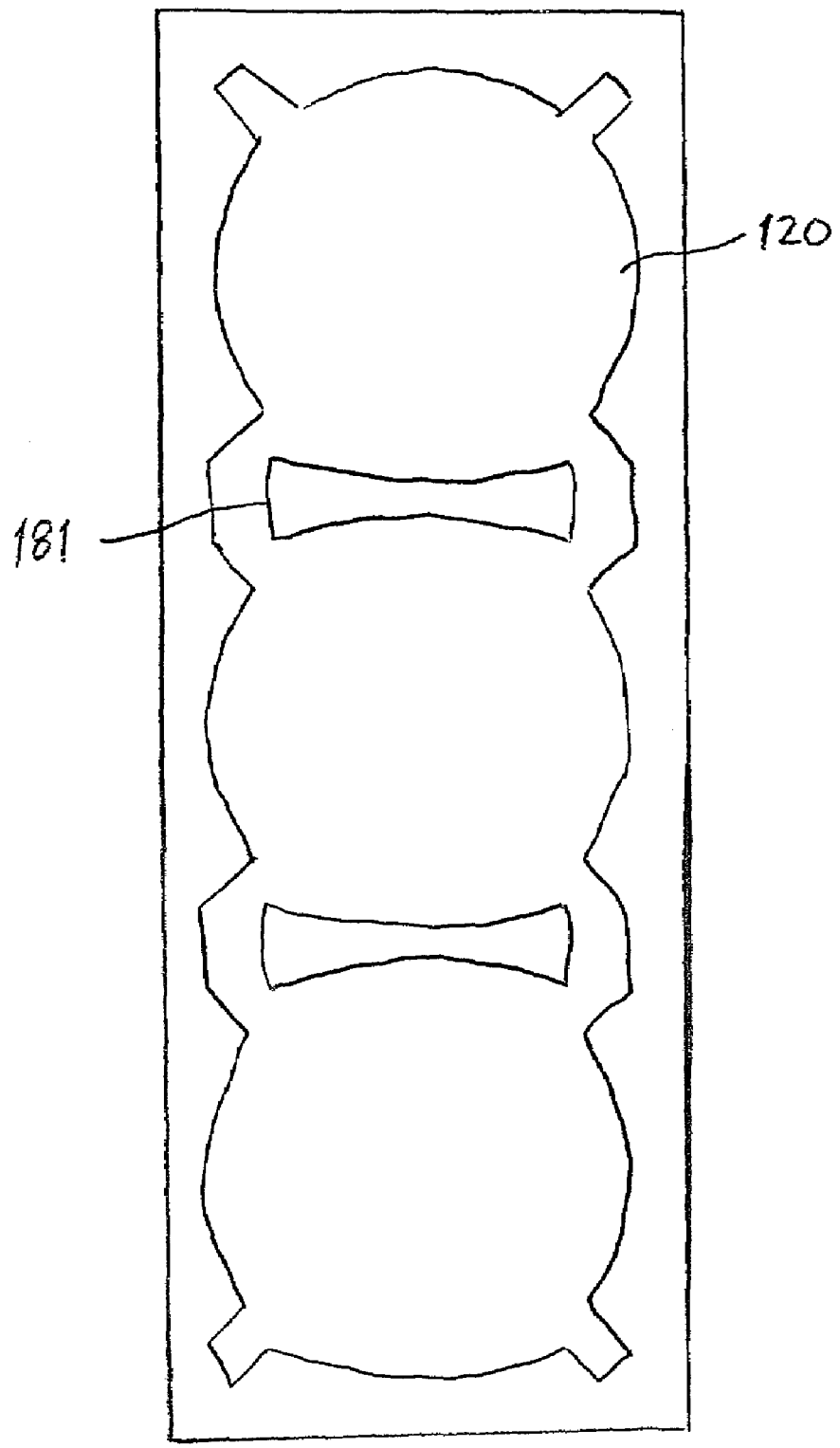
FIG. 11B is a layout view of a color filter panel according to an embodiment of the present invention.

In the above embodiments, both the projections and the openings are provided on the TFT array panel. However, the projections may be provided on a color filter panel opposite to the TFT array panel, and the openings alone may be provided on the TFT array panel. Furthermore, the openings alone may be provided on both the panels. In this case, the planer shapes of the projections or the openings may be the same as those of the first to the fourth embodiments. For example, referring to FIGS. 10A and 11A, a color filter panel includes a substrate 110 and a common electrode 120 formed on the substrate. The common electrode 120 includes projections 171. Referring to FIGS. 10B and 11B, a color filter panel includes a substrate 110 and a common electrode 120 formed on the substrate. The common electrode 120 is shown including an opening 181 dividing portions of the common electrode 120.

Figure 7:
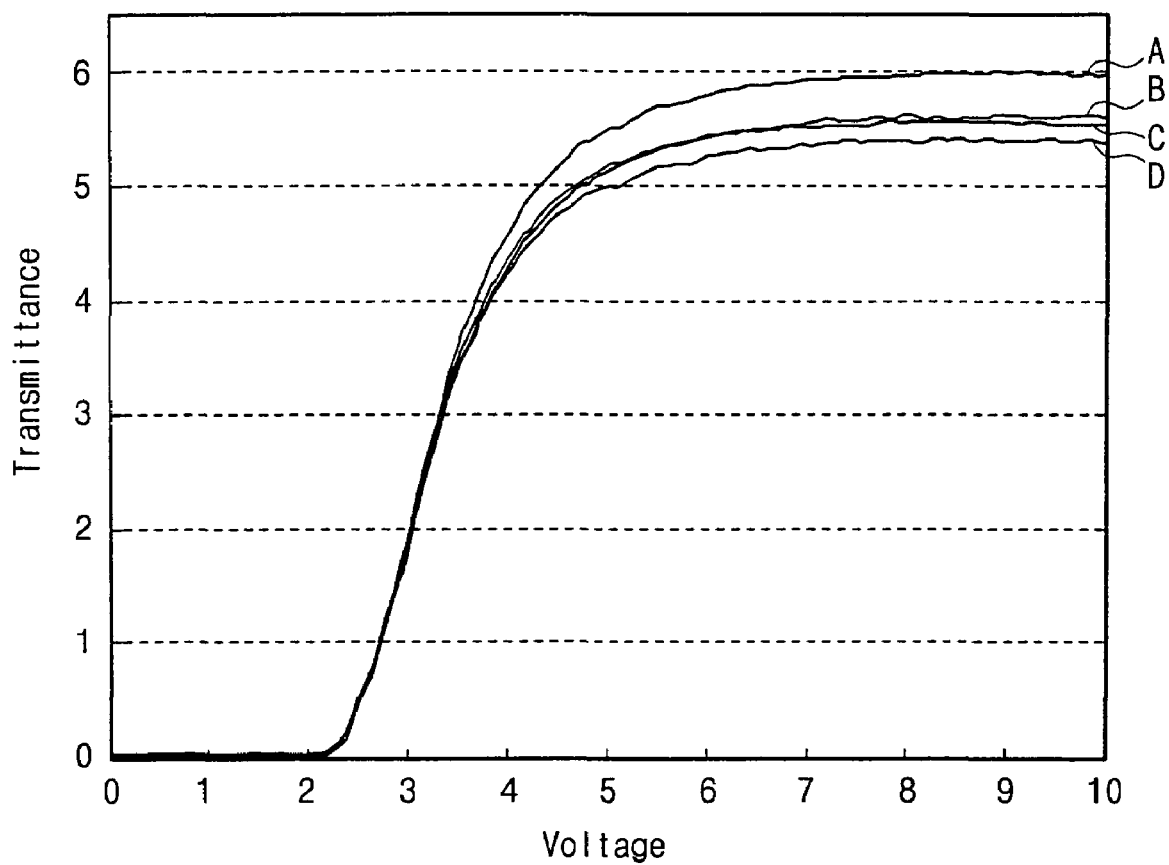
FIG. 7 is a graph showing voltage-transmittance characteristics of the LCDs according to a conventional technique and the first and the second embodiments of the present invention.
Figure 8:
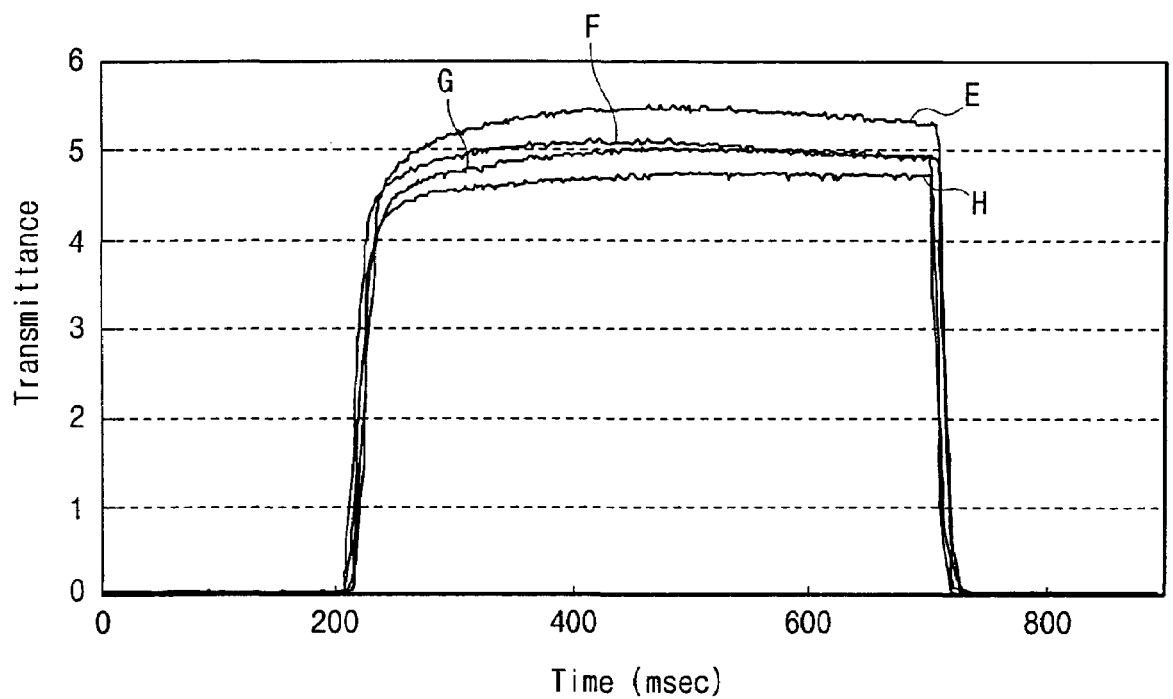
FIG. 8 is a graph showing time-transmittance characteristics of the LCDs according to a conventional technique and the first and the second embodiments of the present invention.

FIGS. 7 and 8 show transmittance as function of applied voltage and time lapse, respectively, for LCDs according to a conventional technique and the first and the second embodiments of the present invention. The curves A and E, B and F, C and G, and D and H are those of a conventional LCD, the first embodiment LCD, the second embodiment LCD, and a modified embodiment LCD where the interior angles of the triangular areas near the center of the X-shaped members are smaller than those of the second embodiment, respectively.

As shown in FIGS. 7 and 8, although the transmittances of the LCDs according to the present invention are slightly smaller than that of the conventional LCD, they are still satisfactory to displaying images with gray scale. In addition, the curves F, G and H of the present invention are flatter than the curve E of the conventional technique as shown in FIG. 8.

The following table 1 shows the response time of the above-described LCDs of the present invention compared with the conventional technique.

TABLE 1

|  | $T_{on}$ | $T_{off}$ | $T_{total}$ |
| --- | --- | --- | --- |
| The Conventional Technique | 31.6 | 13.8 | 45.4 |
| The First Embodiment | 21.3 | 14.4 | 35.7 |
| The Second Embodiment | 27.2 | 14.7 | 41.9 |
| The Modified Second Embodiment | 29.7 | 14.3 | 44.0 |

As shown in Table 1, the response time of the LCDs of the present invention is shorter than that of the conventional technique. As described above, the improved response time of the present invention results from the reinforcement of the splay and the bend arrangements.

Figure 9A:
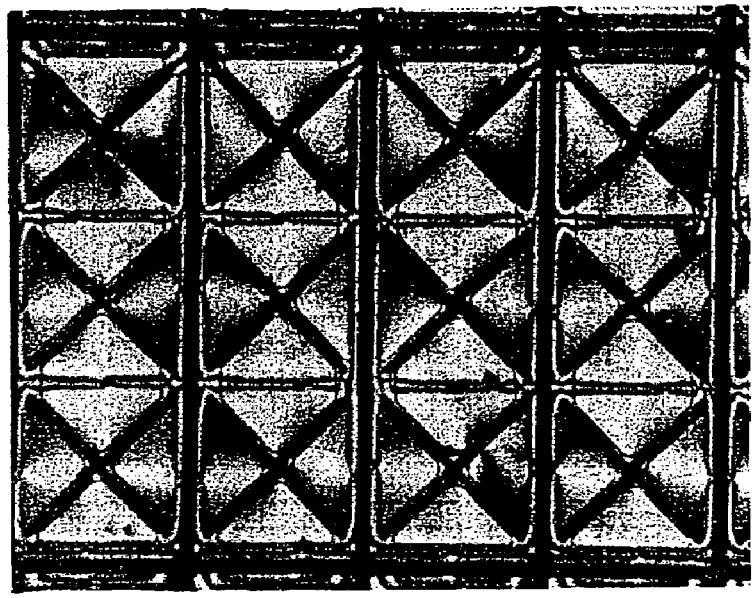
FIG. 9A shows a matrix of pixels according to a preferred embodiment of the present invention when the distance between a data line and a pixel electrode is 5 µm.
Figure 9B:
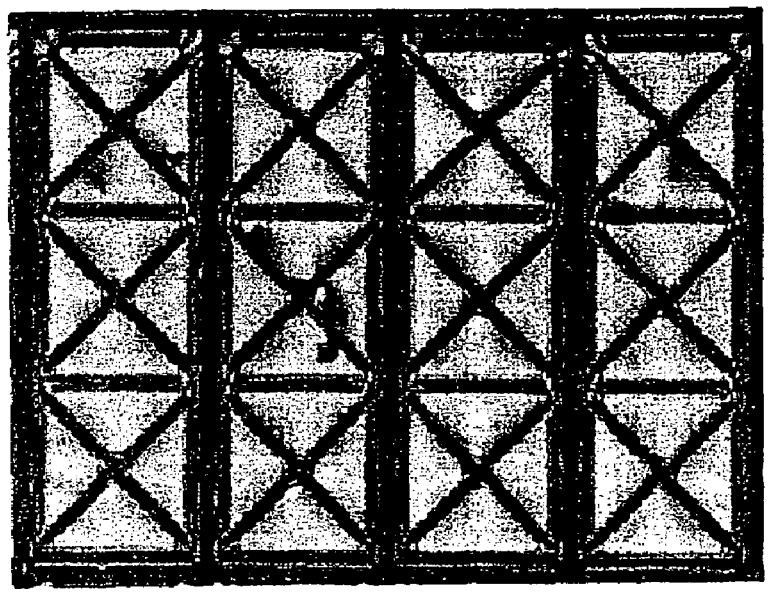
FIG. 9B shows a matrix of pixels according to a preferred embodiment of the present invention when the distance between a data line and a pixel electrode is 10 µm.

FIGS. 9A and 9B show a matrix of pixels when the distance between a data line and a pixel electrode is 5 μm and 10 μm, respectively.

As shown in the figures, an amount of brush or texture in the case of 10 μm distance is smaller than that in the case of 5 μm distance. That is, as the distance between the pixel electrodes increases, the alignment of the liquid crystal molecules becomes stable, thereby diminishing brush or texture.

The present invention reinforces the bend and the splay arrangement of the liquid crystal molecules so as to improve the response time.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display, comprising:
a first substrate;
a pixel electrode formed on the first substrate, said pixel electrode having a plurality of openings; and
a plurality of projected portions on the first substrate, wherein outlines of the pixel electrode are curved, and a shape of each portion of the pixel electrode divided by the openings is substantially a curved rectangle.

2. A liquid crystal display, comprising:
a first substrate;
a pixel electrode formed on the first substrate, said pixel electrode having a plurality of openings; and
a plurality of projected portions on the first substrate, wherein outlines of the pixel electrode are curved, and a shape of each portion of the pixel electrode divided by the openings is substantially circular.

3. A liquid crystal display, comprising:
a first substrate;
a pixel electrode formed on the first substrate, said pixel electrode having a plurality of traverse openings;
a second substrate facing the first substrate;
a plurality of projected portions on the second substrate; and
a common electrode formed on the second substrate, wherein outlines of the pixel electrode are curved, and a shape of each portion of the pixel electrode divided by the traverse openings is substantially a curved rectangle or circular in plane view.

4. A liquid crystal display, comprising:
a first substrate;
a pixel electrode formed on the first substrate, said pixel electrode having a plurality of traverse openings;
a second substrate facing the first substrate; and
a common electrode formed on the second substrate, said common electrode having a plurality of openings, wherein outlines of the pixel electrode are curved, and a shape of each portion of the pixel electrode divided by the traverse openings is substantially a curved rectangle or circular in plane view.

* * * * *